US009123000B2

(12) United States Patent
Gartner

(10) Patent No.: US 9,123,000 B2
(45) Date of Patent: Sep. 1, 2015

(54) AUTOMATIC GENERATION OF CALENDARIZATION CURVES

(76) Inventor: Friedrich Gartner, Hillsborough, NC (US)

( * ) Notice: Subject to any disclaimer, the term of this patent is extended or adjusted under 35 U.S.C. 154(b) by 2410 days.

(21) Appl. No.: 11/262,607

(22) Filed: Oct. 31, 2005

(65) Prior Publication Data

US 2007/0100683 A1     May 3, 2007

(51) Int. Cl.
*G06Q 10/00* (2012.01)
*G06Q 10/04* (2012.01)
*G06Q 30/02* (2012.01)

(52) U.S. Cl.
CPC .......... *G06Q 10/04* (2013.01); *G06Q 30/0202* (2013.01)

(58) Field of Classification Search
CPC ....... G06Q 40/06; G06Q 40/00; G06Q 40/08; G06Q 30/02; G06Q 10/10; G06Q 30/0201; G06Q 10/06; G06Q 40/04; G06Q 40/02; G06Q 30/0206; G06Q 10/087; G06Q 30/0202; G06Q 40/025; G06Q 10/06375; G06Q 30/0283; G06Q 10/04; G06Q 30/06
USPC ............................................... 705/7.11–7.42
See application file for complete search history.

(56) References Cited

U.S. PATENT DOCUMENTS

| | | | | | |
|---|---|---|---|---|---|
| 4,887,207 | A | * | 12/1989 | Natarajan | 705/7.29 |
| 5,128,861 | A | * | 7/1992 | Kagami et al. | 705/7.31 |
| 5,269,000 | A | * | 12/1993 | Ohuchi | 345/442 |
| 5,323,333 | A | * | 6/1994 | Johnson | 703/1 |
| 5,459,656 | A | * | 10/1995 | Fields et al. | 705/7.22 |
| 5,615,109 | A | * | 3/1997 | Eder | 705/7.12 |
| 5,842,199 | A | * | 11/1998 | Miller et al. | 1/1 |
| 6,012,834 | A | * | 1/2000 | Dueck et al. | 700/238 |
| 6,032,125 | A | | 2/2000 | Ando | |
| 6,101,460 | A | * | 8/2000 | Brinkerhoff et al. | 702/179 |
| 6,151,582 | A | * | 11/2000 | Huang et al. | 705/7.25 |
| 6,473,084 | B1 | * | 10/2002 | Phillips et al. | 345/440 |
| 6,609,101 | B1 | * | 8/2003 | Landvater | 705/7.25 |
| 6,611,726 | B1 | * | 8/2003 | Crosswhite | 700/99 |

(Continued)

OTHER PUBLICATIONS

Kenneth B. Kahn "An exploratory Investigation of new product forecasting practices"; The Journal of Product Innovation Management 19 (2002) 133-143.*

(Continued)

*Primary Examiner* — Alan S Miller
(74) *Attorney, Agent, or Firm* — Triangle Patents, PLLC

(57) ABSTRACT

The present invention is directed to a method of generating estimates of a sales opportunity's impact. In the preferred embodiment, software carries out the method on a computer. The software provides a graphical user interface that the user uses to input several variables including the following: a number of events for a period of time, an event interval (e.g. day, week, month, etc.), a start date, and a cumulative result (e.g. total volume, margin, and/or revenue). Additionally, the user selects a predetermined curve shape that he or she subjectively believes will best estimate the distribution of the result(s) over the time period. Then, the software causes the computer to discretely distribute the results over the period of time, at the specified event interval, according to the predetermined curve shape. The present invention provides more accurate forecast data to an organization's management than previously provided by the prior art, which required the user, or sales representative, to manually develop forecast data for each individual impact point. Therefore, the present invention saves time, improves accuracy, and reduces tension in the organization's sales force.

18 Claims, 17 Drawing Sheets

(56) References Cited

U.S. PATENT DOCUMENTS

| | | | |
|---|---|---|---|
| 6,708,156 B1 | 3/2004 | Gonten | |
| 6,745,150 B1* | 6/2004 | Breiman | 702/181 |
| 6,792,399 B1* | 9/2004 | Phillips et al. | 705/36 R |
| 6,804,657 B1* | 10/2004 | Sultan | 705/7.31 |
| 6,882,958 B2* | 4/2005 | Schmidt et al. | 702/179 |
| 6,907,404 B1* | 6/2005 | Li | 705/36 R |
| 6,910,017 B1 | 6/2005 | Woo et al. | |
| 6,920,464 B2* | 7/2005 | Fox | 707/732 |
| 6,978,249 B1* | 12/2005 | Beyer et al. | 705/7.31 |
| 6,985,872 B2* | 1/2006 | Benbassat et al. | 705/7.14 |
| 7,072,863 B1* | 7/2006 | Phillips et al. | 705/36 R |
| 7,353,194 B1* | 4/2008 | Kerker et al. | 705/29 |
| 7,599,867 B1* | 10/2009 | Monroe et al. | 705/35 |
| 7,603,286 B2* | 10/2009 | Ouimet | 705/7.31 |
| 7,627,622 B2* | 12/2009 | Conrad et al. | 708/200 |
| 7,725,282 B2* | 5/2010 | Schneider et al. | 702/109 |
| 7,880,741 B2* | 2/2011 | Proebsting et al. | 345/440 |
| 2002/0026347 A1* | 2/2002 | Yanagino et al. | 705/10 |
| 2002/0072957 A1 | 6/2002 | Thompson et al. | |
| 2002/0120492 A1* | 8/2002 | Phillips et al. | 705/10 |
| 2002/0188487 A1* | 12/2002 | Fox | 705/7 |
| 2003/0144868 A1* | 7/2003 | MacIntyre et al. | 705/1 |
| 2003/0144897 A1* | 7/2003 | Burruss et al. | 705/10 |
| 2003/0182175 A1* | 9/2003 | Buie et al. | 705/10 |
| 2003/0212590 A1 | 11/2003 | Klingler | |
| 2004/0249696 A1 | 12/2004 | Mathews et al. | |
| 2005/0075920 A1 | 4/2005 | Li et al. | |
| 2005/0096964 A1* | 5/2005 | Tsai | 705/10 |
| 2005/0102175 A1* | 5/2005 | Dudat et al. | 705/10 |
| 2006/0116930 A1* | 6/2006 | Goldstein | 705/14 |
| 2006/0129447 A1* | 6/2006 | Dockery et al. | 705/10 |
| 2006/0155554 A1* | 7/2006 | Mo | 705/1 |
| 2006/0259338 A1* | 11/2006 | Rodrigue et al. | 705/7 |
| 2007/0067211 A1* | 3/2007 | Kaplan et al. | 705/10 |
| 2008/0021652 A1* | 1/2008 | Schneider et al. | 702/3 |
| 2008/0201182 A1* | 8/2008 | Schneider et al. | 705/7 |

OTHER PUBLICATIONS

Burruss, Jim; Kuettner, Dorothea; "Forecasting for short-lived products: Hewlett-Packard's Journey", Winter 2002/2003, The Journal of Business Forecasting Methods & Systems, 21,4; ABI/INFORM Global, p. 9.*

Snyder, et.al.; "Forecasting for Inventory Control with Exponential Smoothing", Aug. 1999 working paper, Monash University, pp. 1-40.*

Cox, Louis Anthony; "Forecasting Demand for Telecommunications Products from Cross-sectional Data", Mar./Apr. 2001, Telecommunications Systems, 16, 3-4, ABI/INFORM Global, p. 437.*

Culbertson, et.al. "Control system approach to e-commerce fulfillment: Hewlett-Packard's experience", Winter 2000/2001, The Journal of Business Forecasting Methods & Systems, 19, 4, ABI/INFORM Global, p. 10.*

Nelson, Edward, "The Product Life Cycle of Engineered Metals: a comparative analysis of the application of product life cycle theory", Spring 1992, The Journal of Business & Industrial Marketing, 7, 2, ABI/INFORM Global, p. 5.*

Cox, William E., Jr; "Product Life Cycles as Marketing Models", (Oct. 1967), The Journal of Business, vol. 40, No. 4. pp. 375-384.*

\* cited by examiner

AUTOMATIC GENERATION OF CALENDARIZATION CURVES

BACKGROUND OF THE INVENTION

1. Field of the Invention

The present invention relates generally to sales opportunity forecasting and, more particularly, to a method of generating estimates of a sales opportunity's impact, and the collective impact of several sales opportunities.

2. Description of the Prior Art

Typically, sales representatives within an organization are called on to evaluate their current opportunities. These evaluations usually require the individuals to give estimates of the opportunities probable financial impact over time. Currently, this is done manually, with the sales representative manually entering the estimates into a spreadsheet and then generating a forecast curve and data. This consumes considerable amount of the representative's time, is inefficient, and is stressful under a deadline; additionally, the final result is not very useful because it is often inaccurate.

Manually generating sales and related forecasts is inefficient and not very useful because the sales representatives usually do not know the finer details of the opportunity. They are not privy to the many facts and assumptions that must be determined or made in order to correctly forecast an opportunity at specific points in time. However, they generally know how the forecast curve should function over time-that is they know the general shape of the curve based on how the representatives expect the results of an opportunity to come in to the organization (slow start, then ramp up; fast start, then slow down; etc). Approximate forecast curve shapes that sales representatives typically expect and use are demonstrated in FIGS. 1-15. Further, sales representatives generally know what time period the organization should expect to experience the opportunity and what the cumulative results (total revenue, margin, and/or volume) are over that period. These individuals therefore know the overall shape of the forecast curve, its cumulative total, and the time period over which the opportunity should be forecast. They know generalities, not the fine details needed to make an accurate curve.

Prior art sales forecasting methods commonly employ historical data to extrapolate future results. In essence, the prior art uses fine details to generate forecast results that mimic/follow historical trends. For example, U.S. Pat. No. 6,910,017 describes Inventory and price decision support software. It teaches deriving a unit sales relationship based on historical data that includes prices and unit sales of an item for a succession of time periods during which the item was sold.

The prior art uses data that is not generally available to sales representatives. Further, these individuals typically have subjective knowledge of how they expect an opportunity to materialize. This may be based on prior dealings with that opportunity, or based on other factors, such as personal knowledge that an opportunity may bring in sales quickly one month and more slowly another. It is this subjective component that needs to be input into a forecast model.

Thus, there remains a need for a method of generating estimates of an opportunity's impact that saves time, reduces tension in the organization's sales force, and provides more accurate forecasts more quickly to management and financial personnel. Further, there is a need for a method and system that generates various forecast curves with a predetermined shape using cumulative results distributed over a given time period.

SUMMARY OF THE INVENTION

The present invention is directed to a method of generating estimates of a sales opportunity's impact. In the preferred embodiment, software carries out the method on a computer. The software provides a graphical user interface that the user uses to input several variables including the following: a number of events for a period of time, an event interval (e.g. day, week, month, etc.), a start date, and a cumulative result (e.g. total volume, margin, and/or revenue). Additionally, the user selects a predetermined curve shape that he or she subjectively believes will best estimate the distribution of the result(s) over the time period. Then, the software causes the computer to discretely distribute the results over the period of time, at the specified event interval, according to the predetermined curve shape.

Optionally, the user may edit the result at a specific data point-for instance, to increase or decrease the revenue because of a known or suspected result at that point in time-however, if the user does modify a data point, then the remaining results must be manually redistributed to maintain the same cumulative result as originally indicated.

Thus, the present invention provides more accurate forecast data to an organization's management than previously provided by the prior art, which required the user, or sales representative, to manually develop forecast data for each impact interval. Therefore, the present invention saves time, improves accuracy in general, and reduces tension in the organization's sales force.

Accordingly, one aspect of the present invention is to provide a method of generating forecast data over a period of time, including the following steps: indicating a number of events for the period of time; indicating an event interval; indicating a start date for the period of time; calculating the period of time by multiplying the event interval by the number of events; generating a series of dates by evenly distributing the number of events over the period of time starting with the start date; indicating at least one cumulative result for the period of time; indicating a predetermined curve shape; and discretely distributing the at least one cumulative result over the period of time at each date in the series of dates thereby creating forecast data such that the forecast data approximates the shape of the predetermined curve shape when viewed graphically.

Another aspect of the present invention is to provide a method of generating and displaying forecast data over a period of time, including the following steps: providing a computer running software and a display, wherein the software displays a user interface capable of receiving input from a user and wherein the user interface displays and receives input for the following: indicating a number of events for the period of time; indicating an event interval; indicating a start date for the period of time; indicating at least one cumulative result for the period of time; and indicating a predetermined curve shape. The software then creates forecast data, which includes the following steps: calculating the period of time by multiplying the event interval by the number of events; generating a series of dates by evenly distributing the number of events over the period of time starting with the start date; and discretely distributing the at least one cumulative result over the period of time at each date in the series of dates thereby creating forecast data such that the forecast data approximates the shape of the predetermined curve shape when viewed graphically. Finally, the software causes the data to be displayed on the display.

These and other aspects of the present invention will become apparent to those skilled in the art after a reading of the following description of the preferred embodiment when considered with the drawings.

DETAILED DESCRIPTION OF THE PREFERRED EMBODIMENTS

Figure 1:
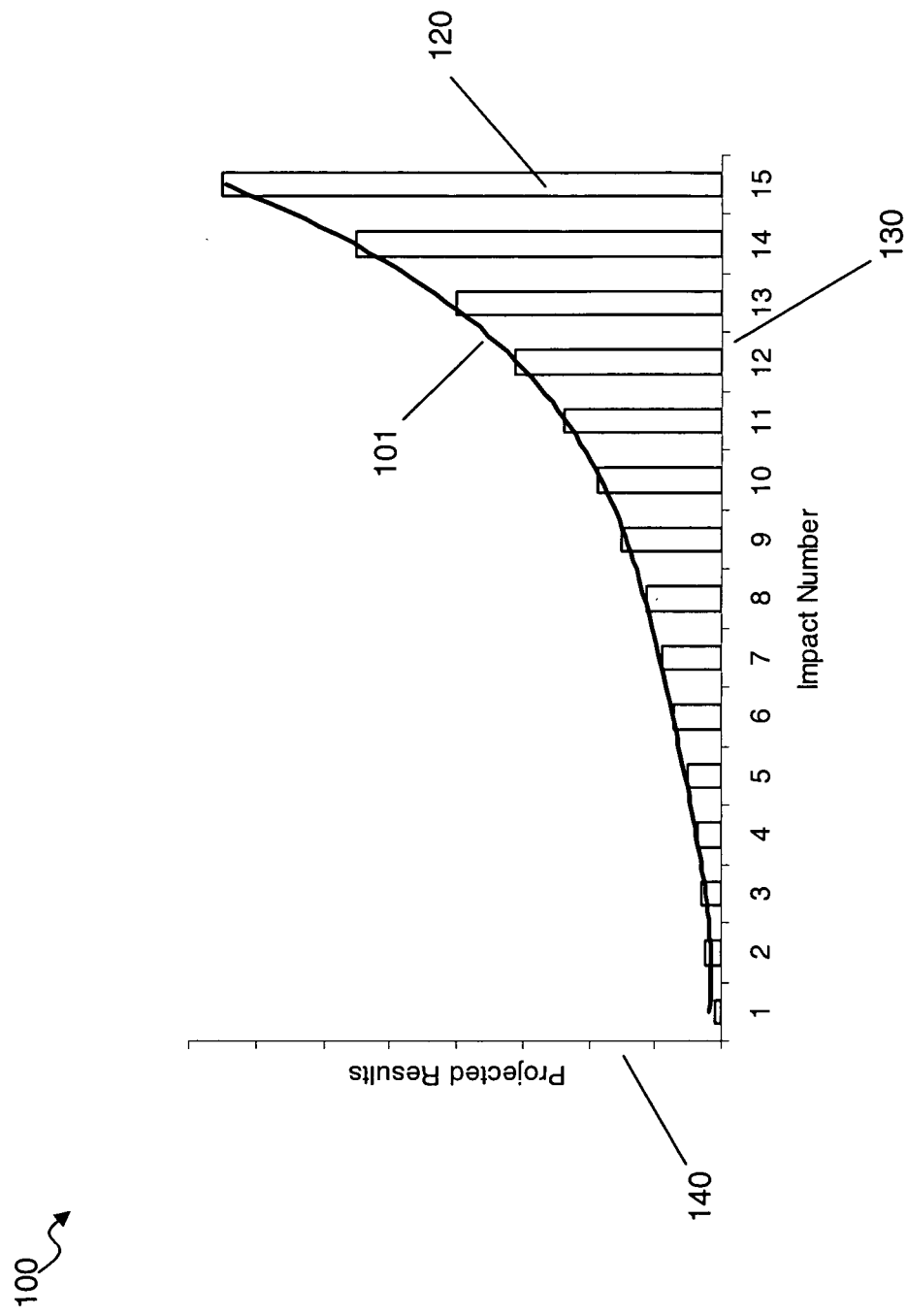
FIG. 1 is a projected result chart containing a predetermined curve shape according to the present invention.
Figure 2:
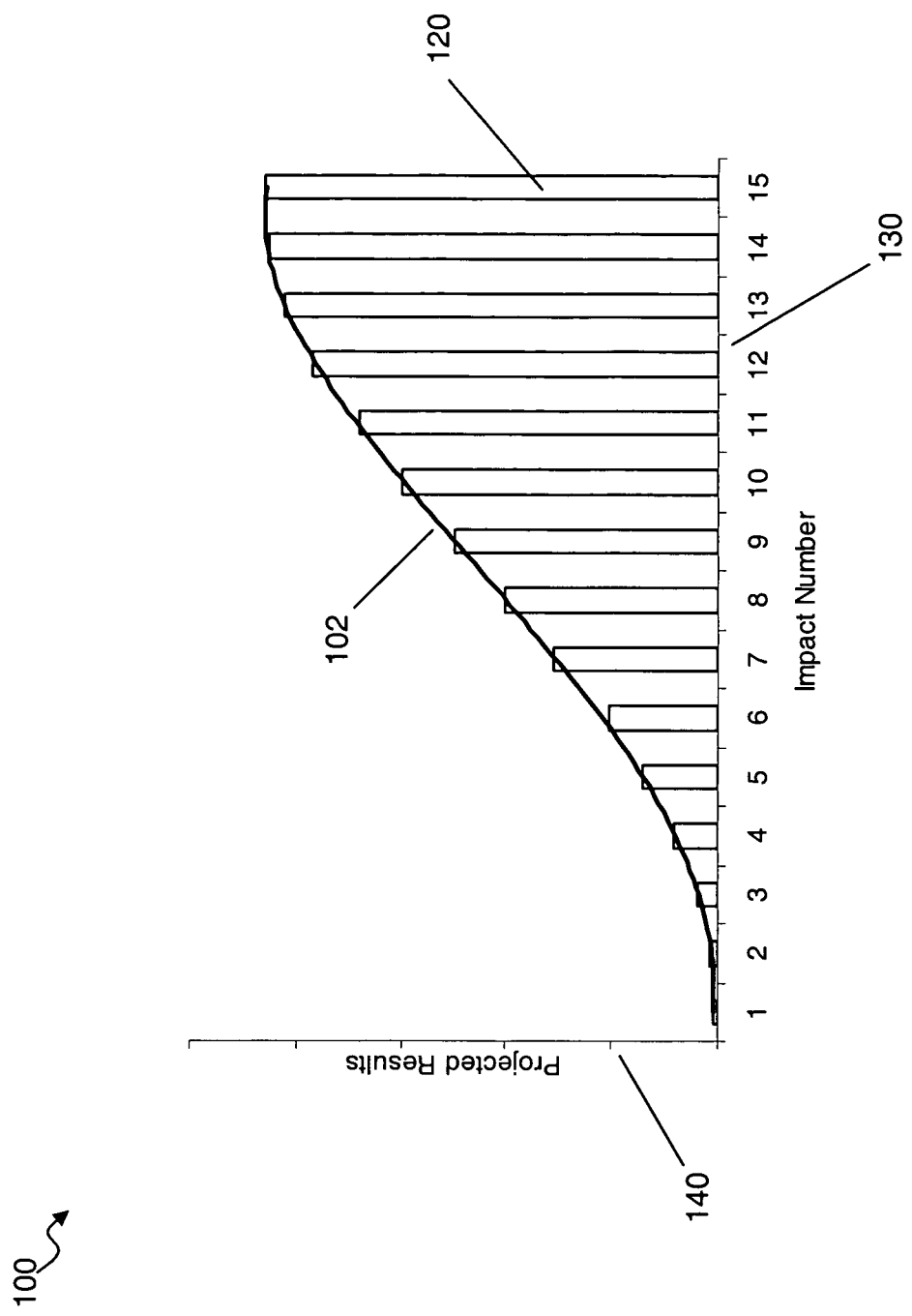
FIG. 2 is a projected result chart containing a predetermined curve shape according to the present invention.
Figure 3:
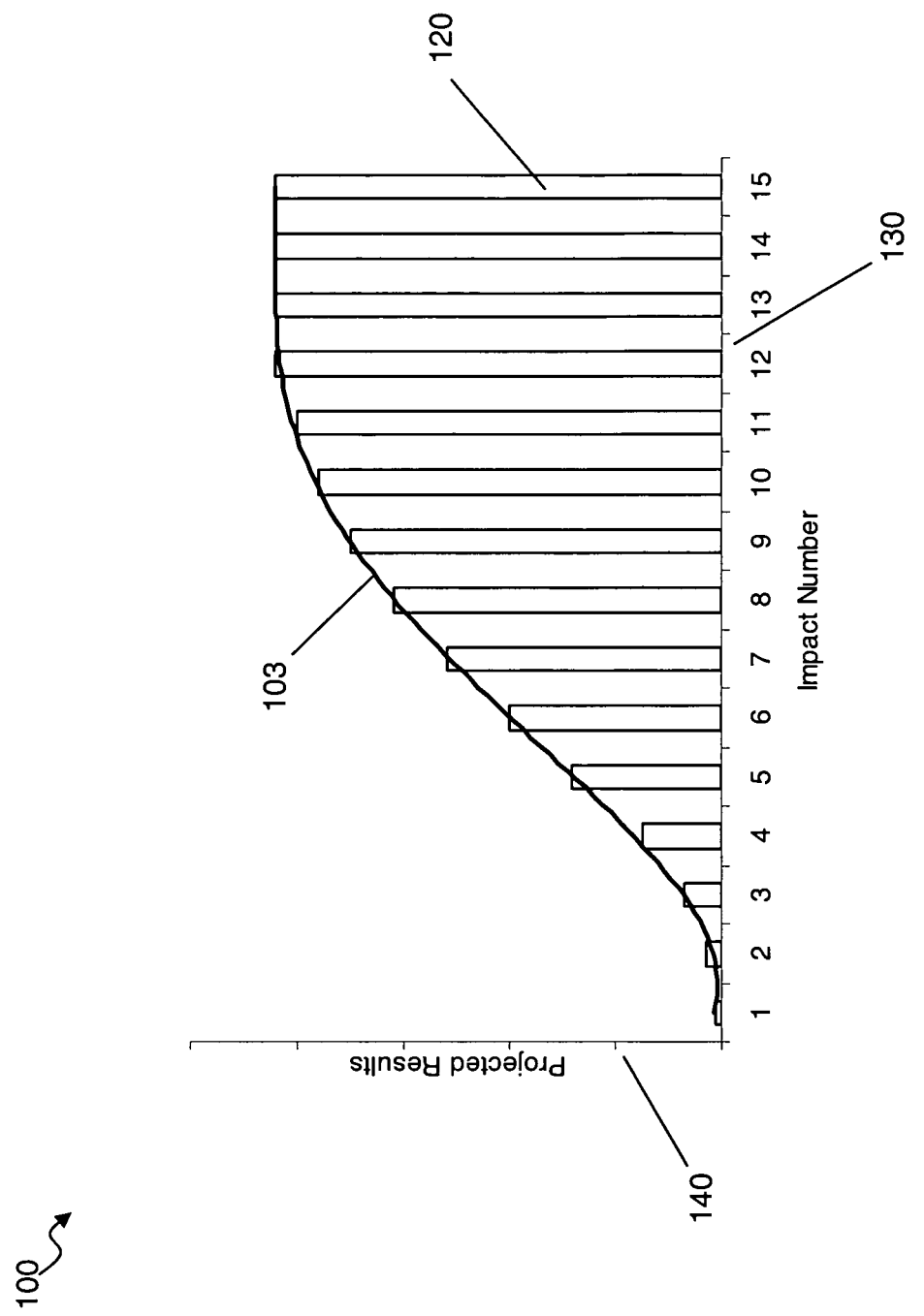
FIG. 3 is a projected result chart containing a predetermined curve shape according to the present invention.
Figure 4:
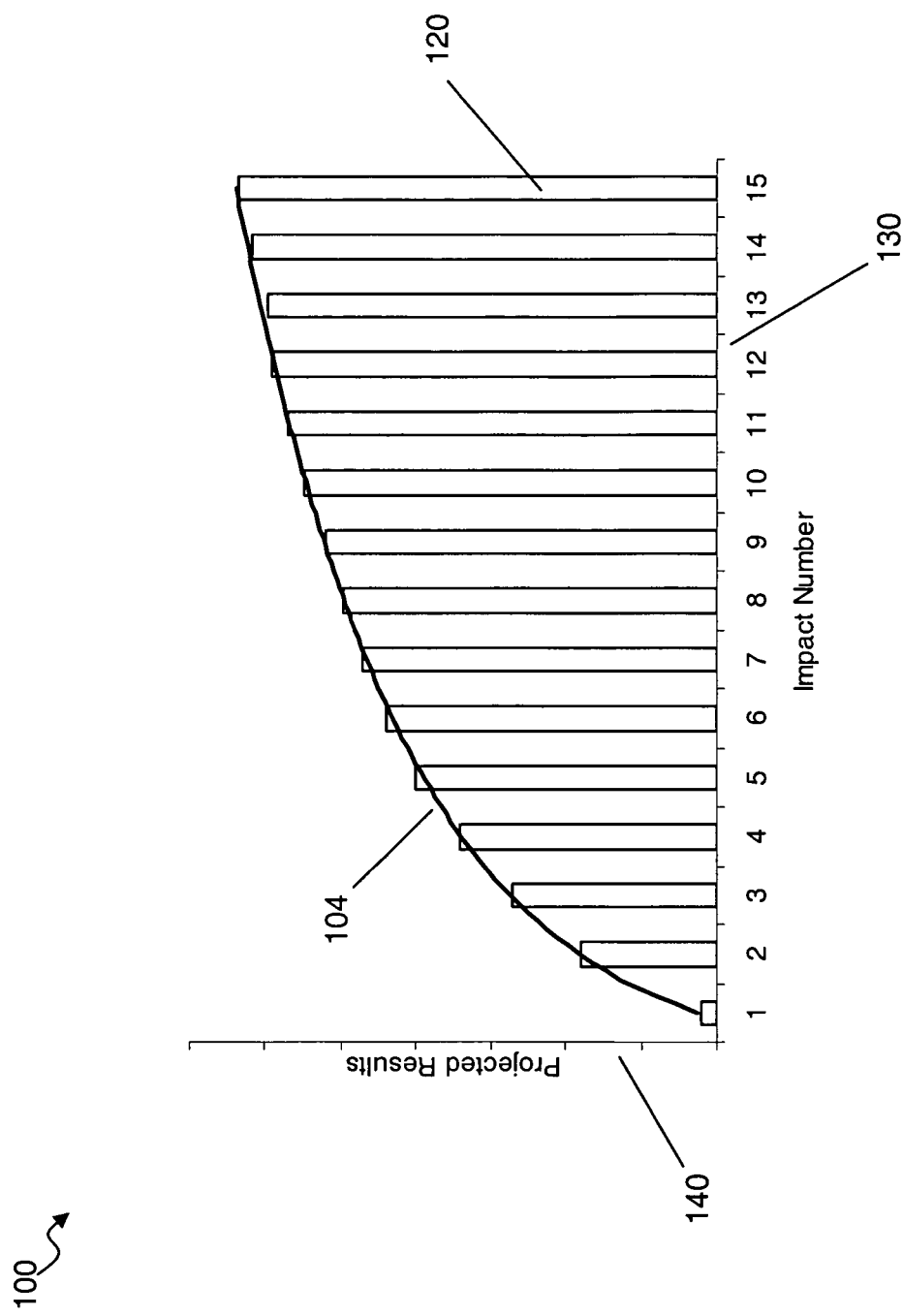
FIG. 4 is a projected result chart containing a predetermined curve shape according to the present invention.
Figure 5:
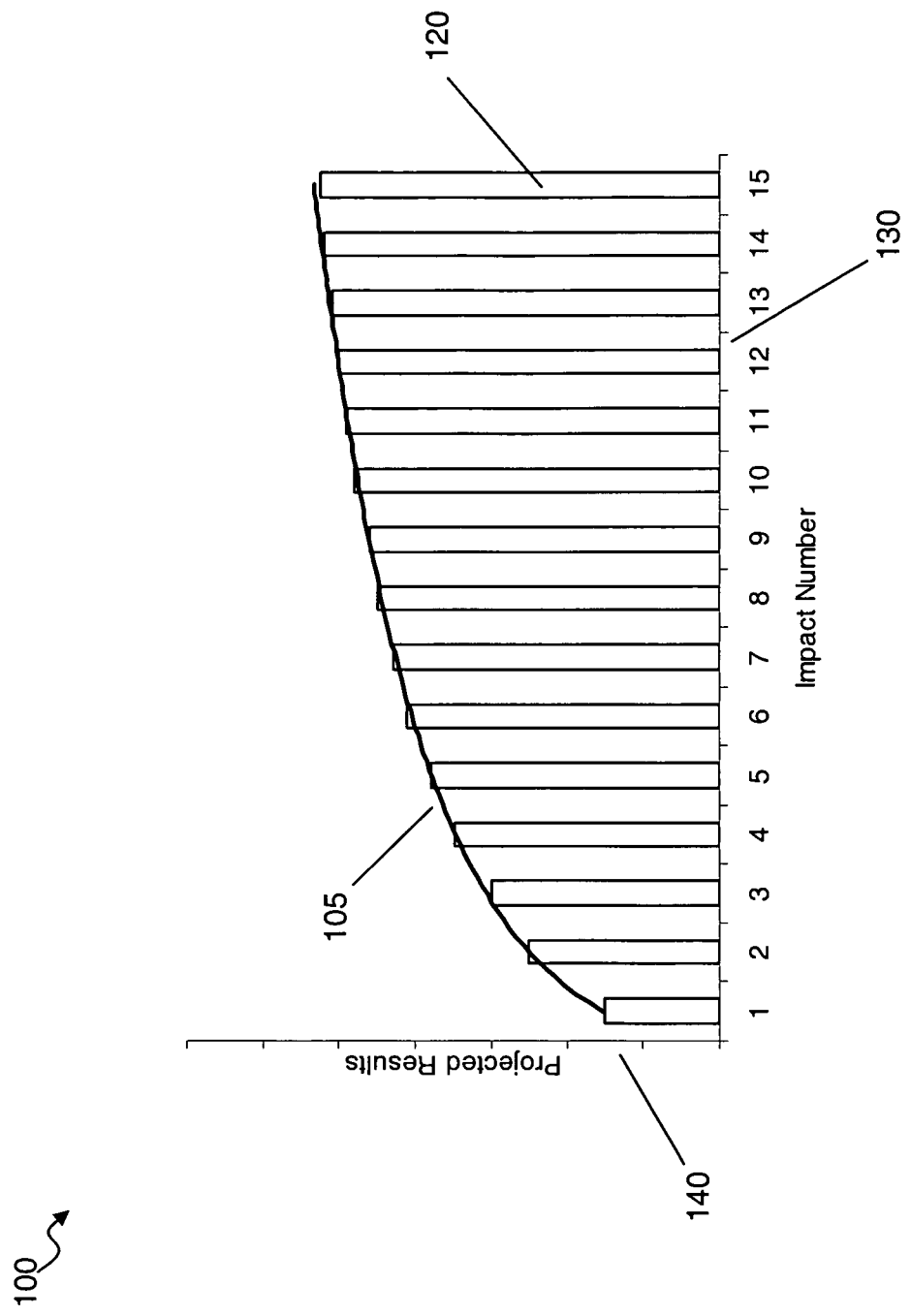
FIG. 5 is a projected result chart containing a predetermined curve shape according to the present invention.
Figure 6:
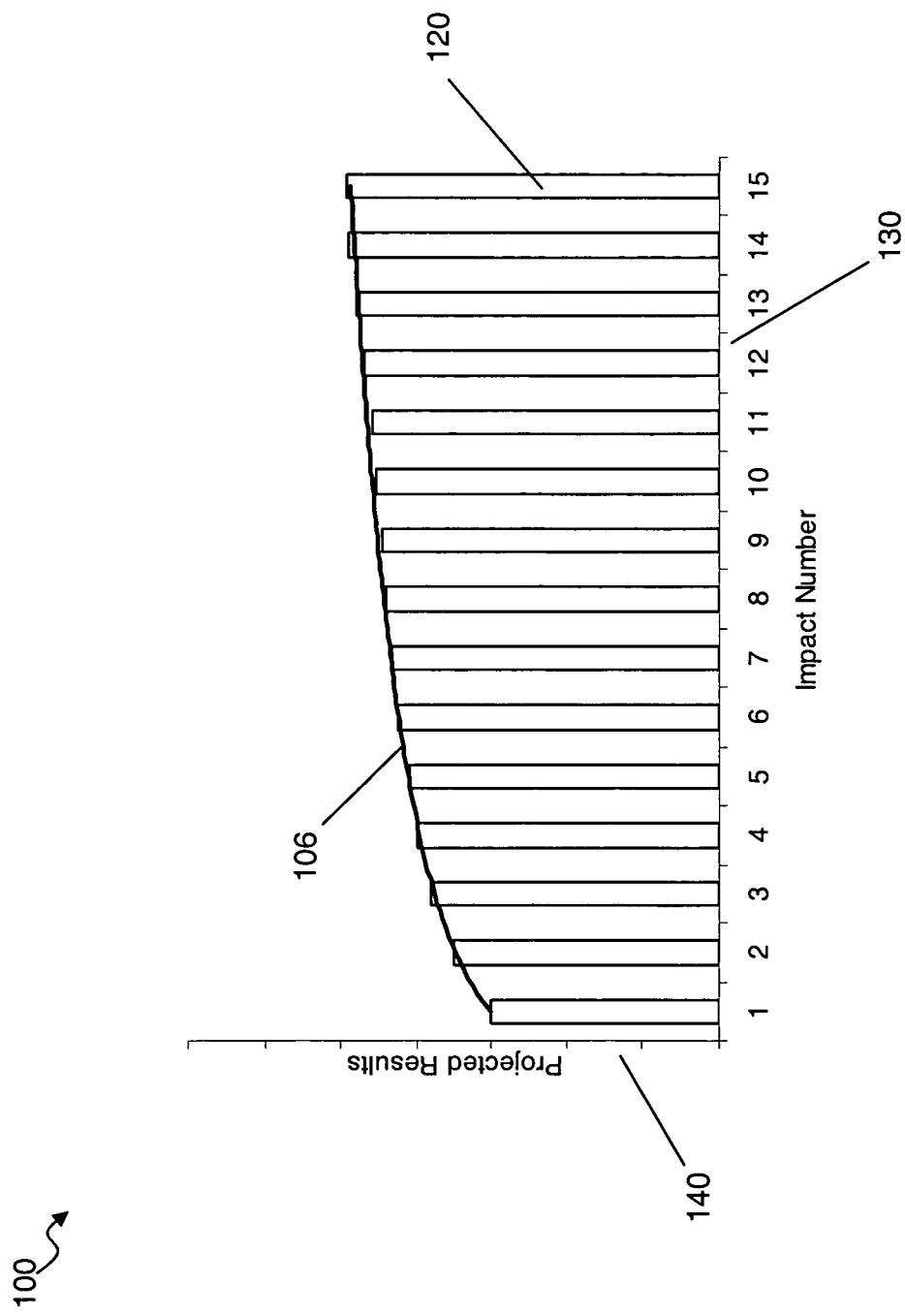
FIG. 6 is a projected result chart containing a predetermined curve shape according to the present invention.
Figure 7:
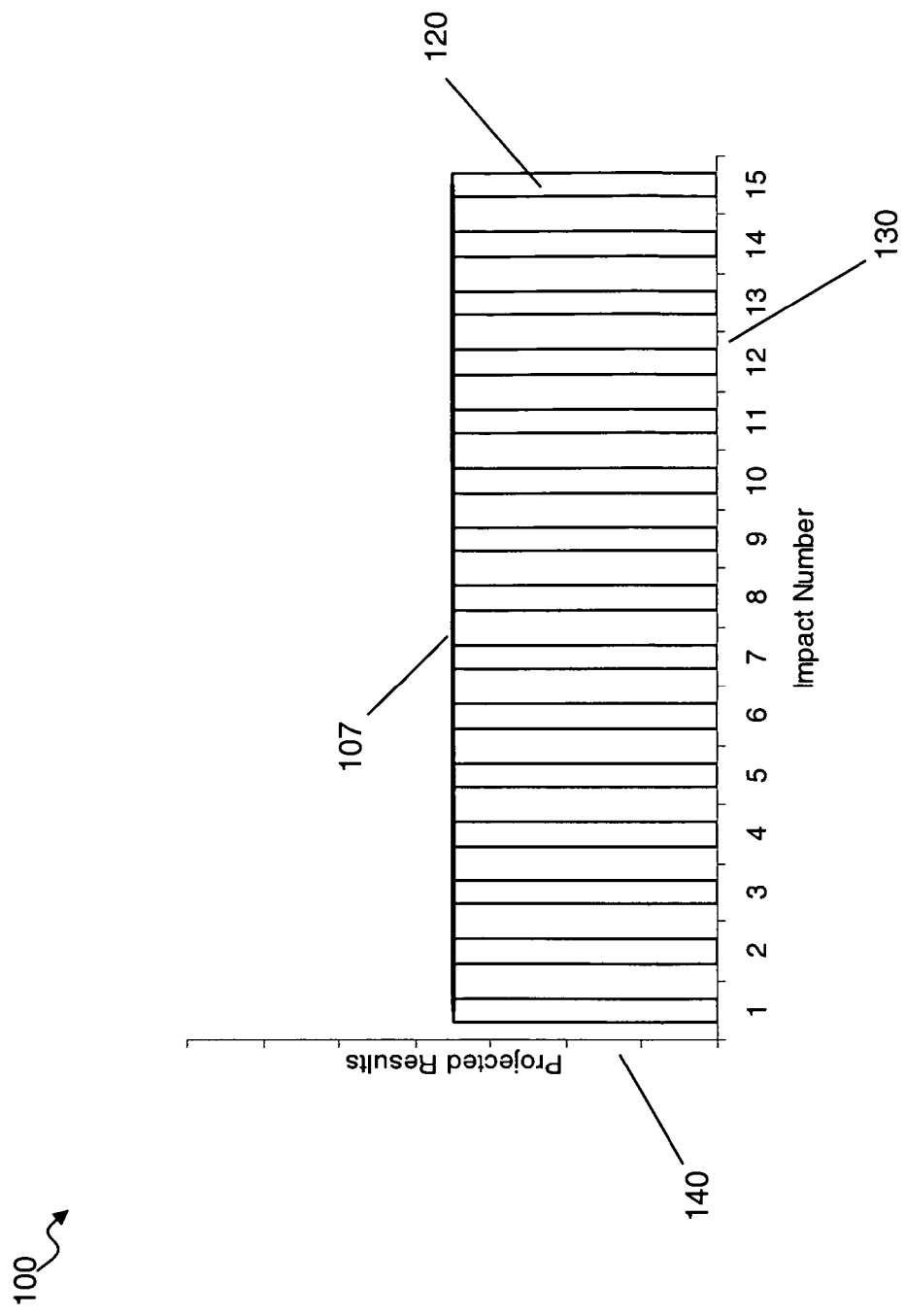
FIG. 7 is a projected result chart containing a predetermined curve shape according to the present invention.
Figure 8:
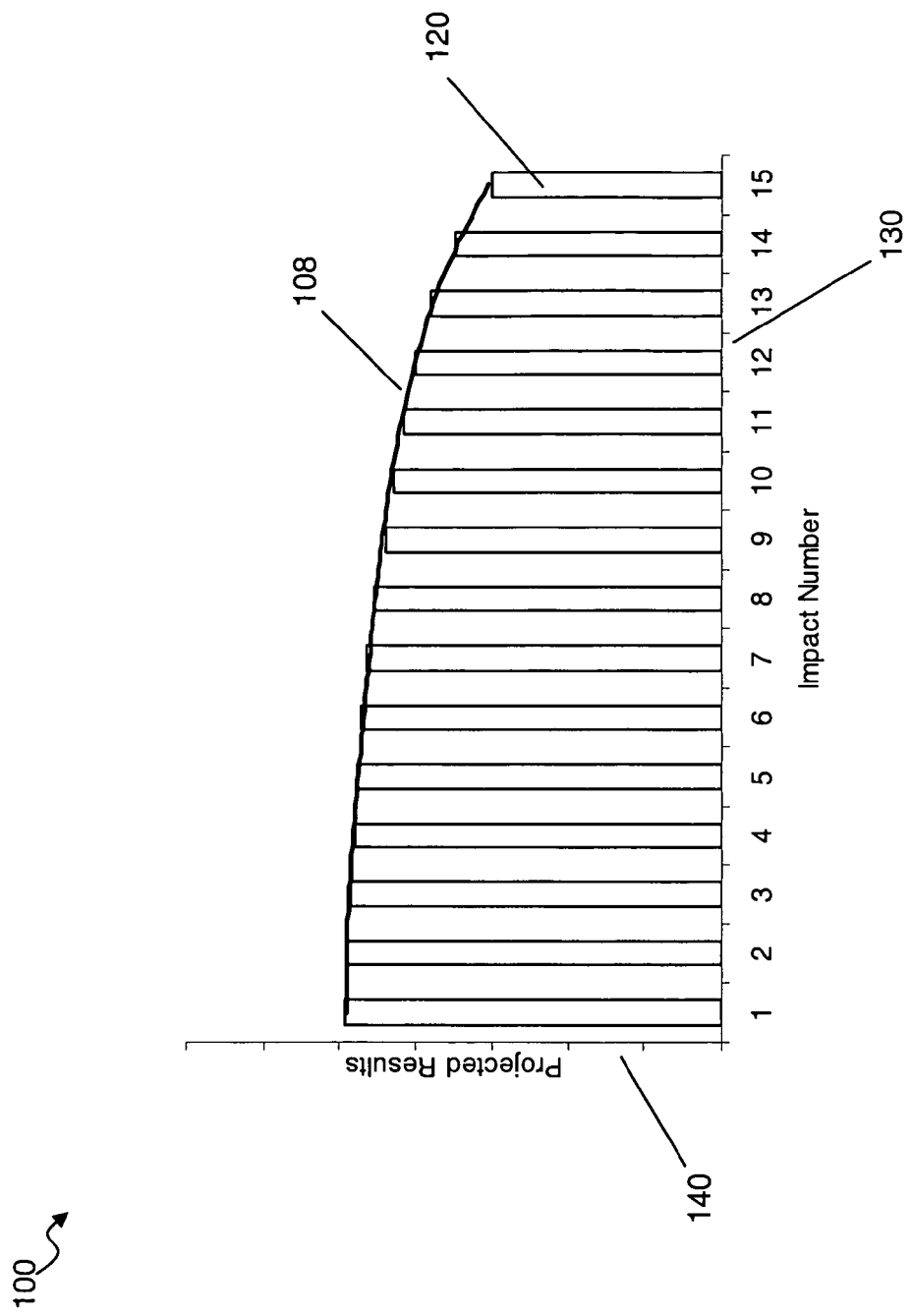
FIG. 8 is a projected result chart containing a predetermined curve shape according to the present invention.
Figure 9:
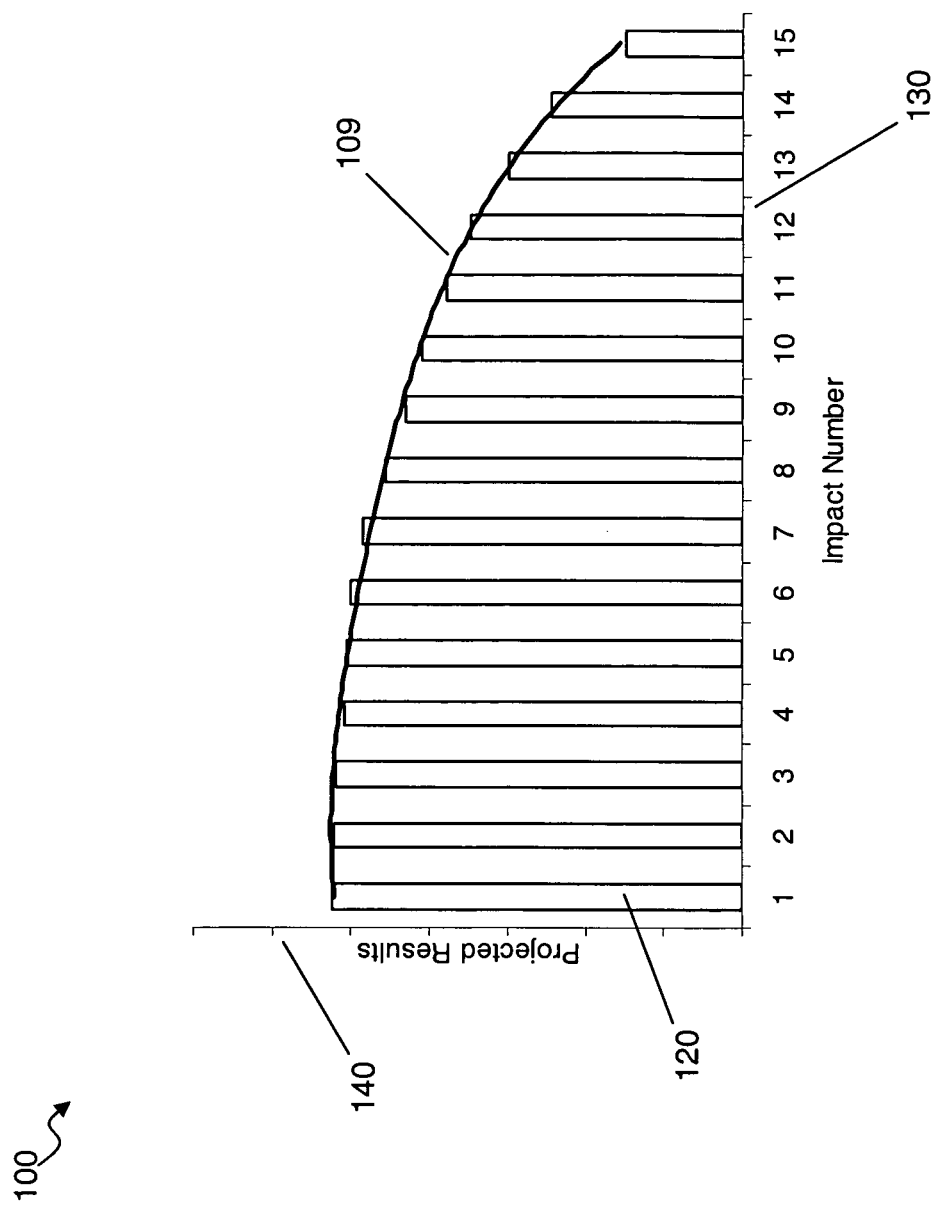
FIG. 9 is a projected result chart containing a predetermined curve shape according to the present invention.
Figure 10:
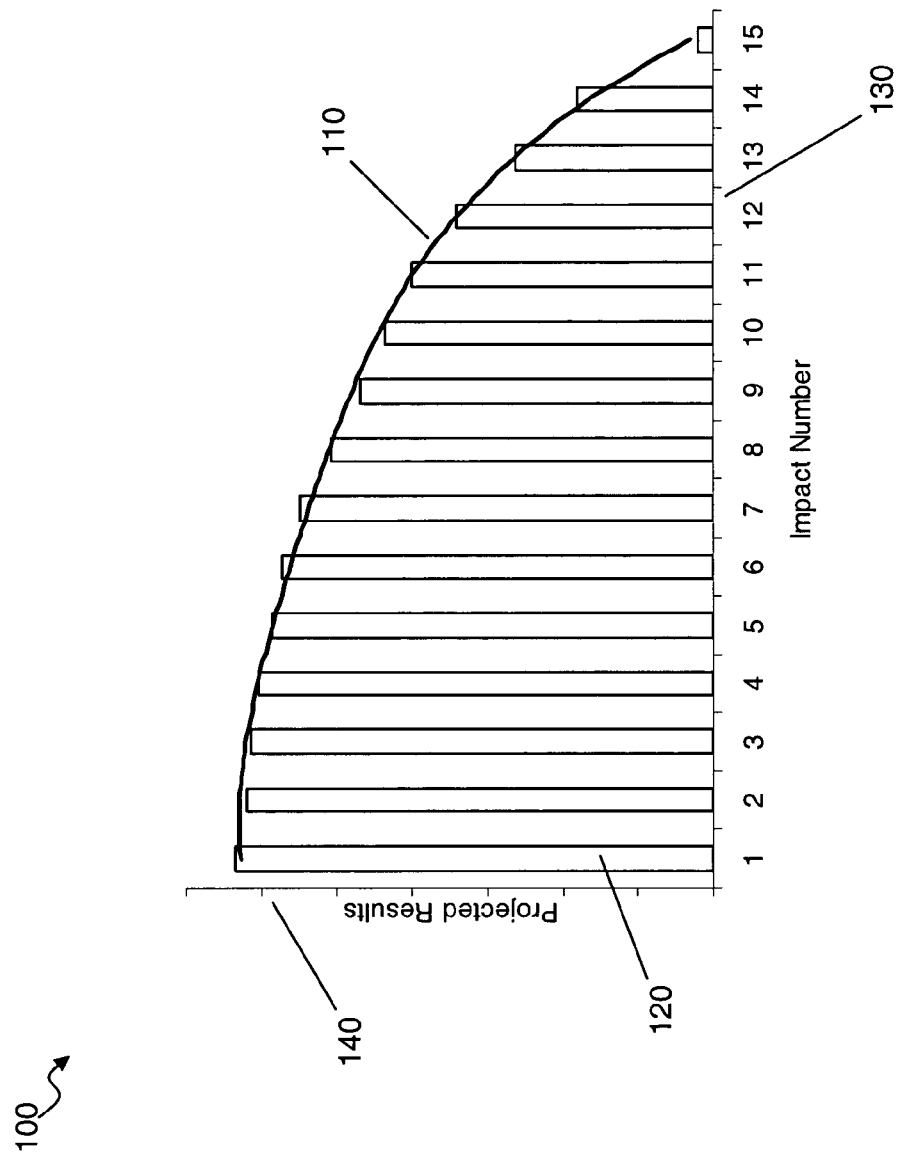
FIG. 10 is a projected result chart containing a predetermined curve shape according to the present invention.
Figure 11:
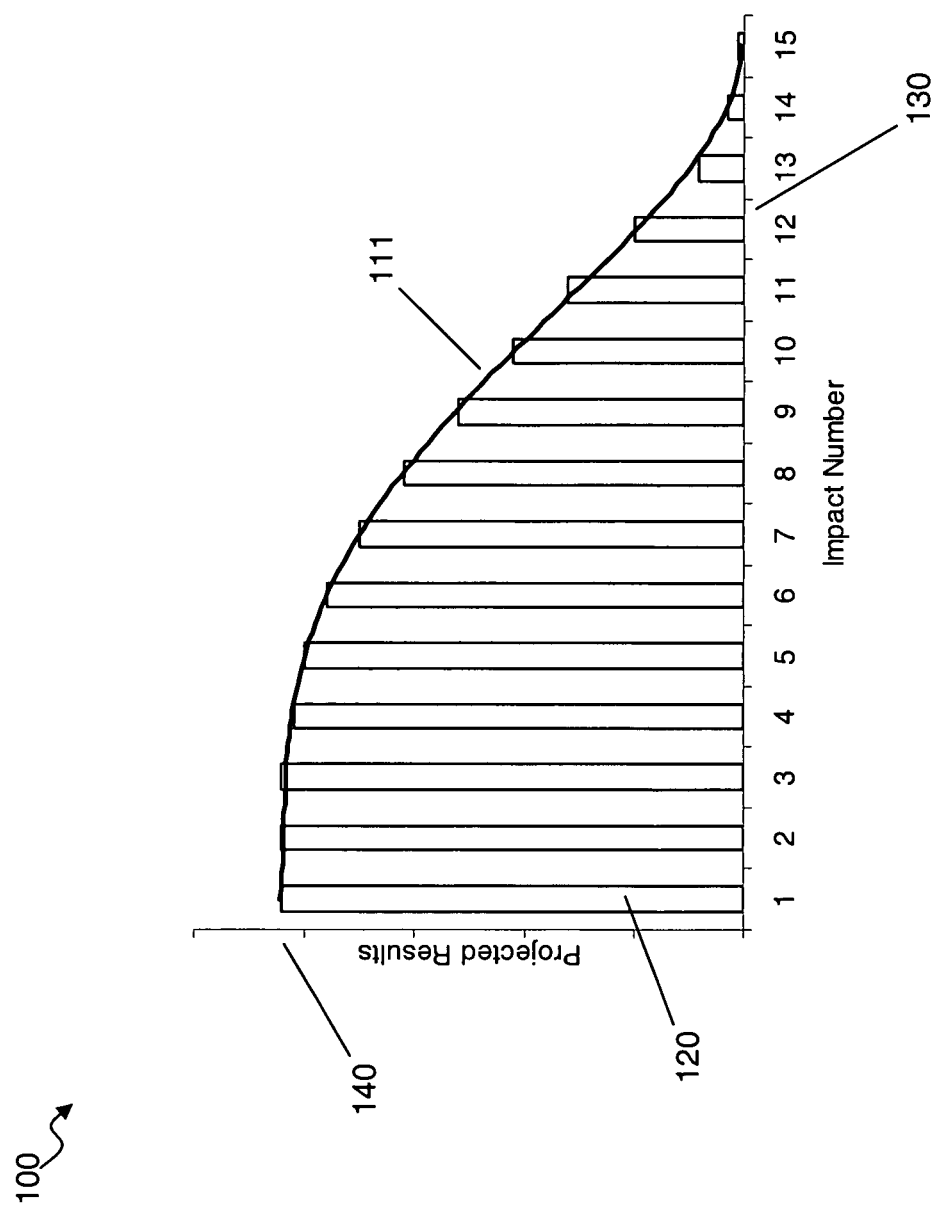
FIG. 11 is a projected result chart containing a predetermined curve shape according to the present invention.
Figure 12:
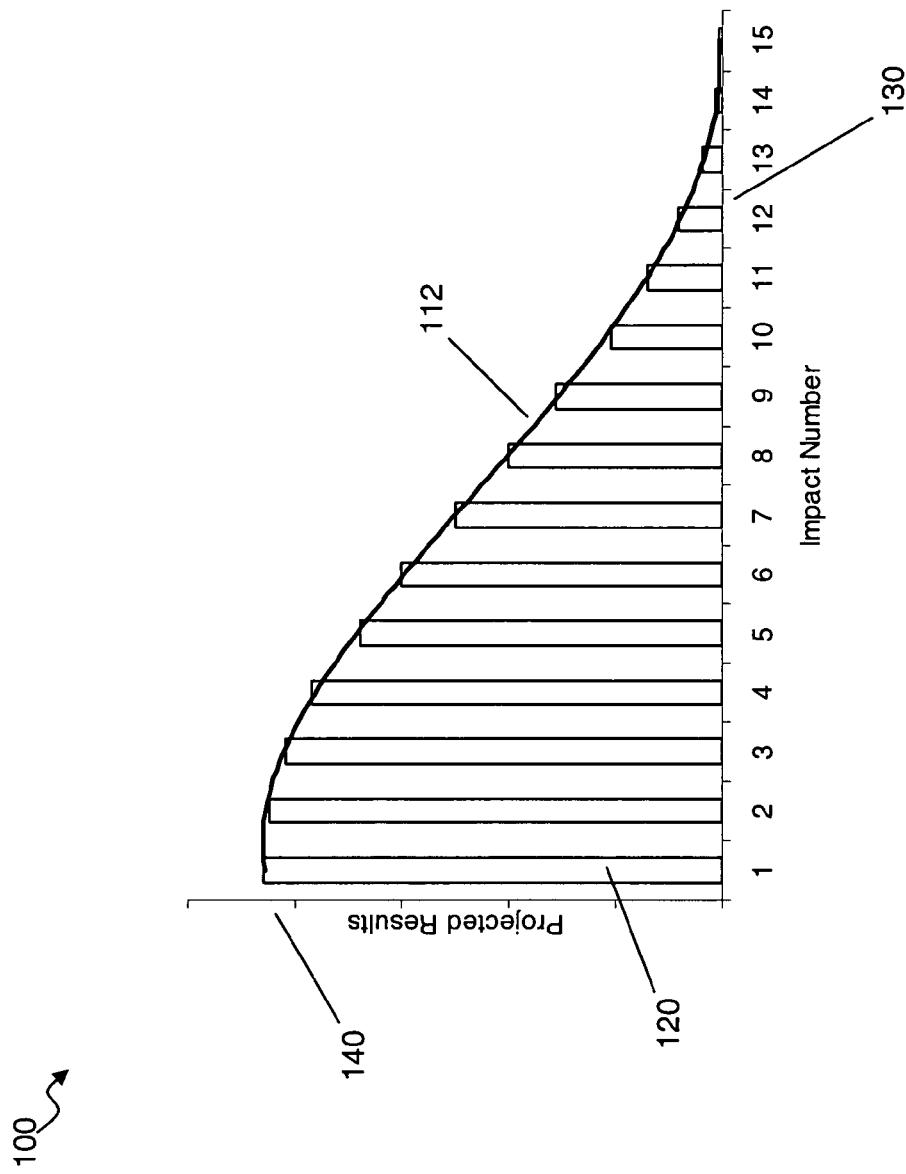
FIG. 12 is a projected result chart containing a predetermined curve shape according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

Members of an organization often need to project the potential results of an opportunity. An opportunity is any item of a project that needs to be tracked. For instance, this may be a sales opportunity. Preferably, an opportunity is any project that incorporates, as its results, revenue, margin, or volume.

For the purposes of discussion and illustration, an organization's sales force is focused on throughout this document. An opportunity is usually discovered when a sales representative communicates with potential or existing customers, either internal or external to the organization. Based on these communications, the representative makes assumptions to arrive at general estimates of the opportunity's results for a period of time and the general behavior of the results over that period of time. The general behavior of the results is usually described by how the representative subjectively believes the organization will experience the opportunity-slow start then ramp up, fast start then slow down, etcetera.

The preferable shapes a sales representative generally expects an opportunity's results to conform to over a time period are shown in the projected results charts of FIGS. 1-15. Each projected result chart 100, has an X-axis 130 representing the impact, or event, number, a Y-axis 140 representing the projected results, and specific impact, or event, results 120. Curves 101-115 represent a best fit of the impact results 120 for each of the projected result charts. For purposes of illustration and to generate a formula embodying the curves, the curves exist only over the impact number domain of 1-15. However, the impact number domain represents any time period, as explained below.

To elucidate the terms used, an impact result is what the organization expects to experience at specific points in time; generally, an impact is when the organization has the right to experience results, such as an invoice date, shipment date, etcetera. The specific points in time are referred to as the impact number. Impacts occur at specific intervals, preferably in days, weeks, months, quarters, or years and parts thereof; these intervals represent how often the organization expects to experience the opportunity's results. A start date dictates when the organization expects to begin executing the opportunity by delivering products, invoicing, or whatever else the organization needs to accomplish to start experiencing the opportunity. Combining a start date with the impact number and the interval between impacts gives the time period over which the opportunity's projected results are distributed. The specific impact results are preferably revenue, margin, and/or volume resulting from experiencing an opportunity. The margin is generally a benefit to the organization; it can be a savings, profit, windfall, or improved negotiating position.

Figure 13:
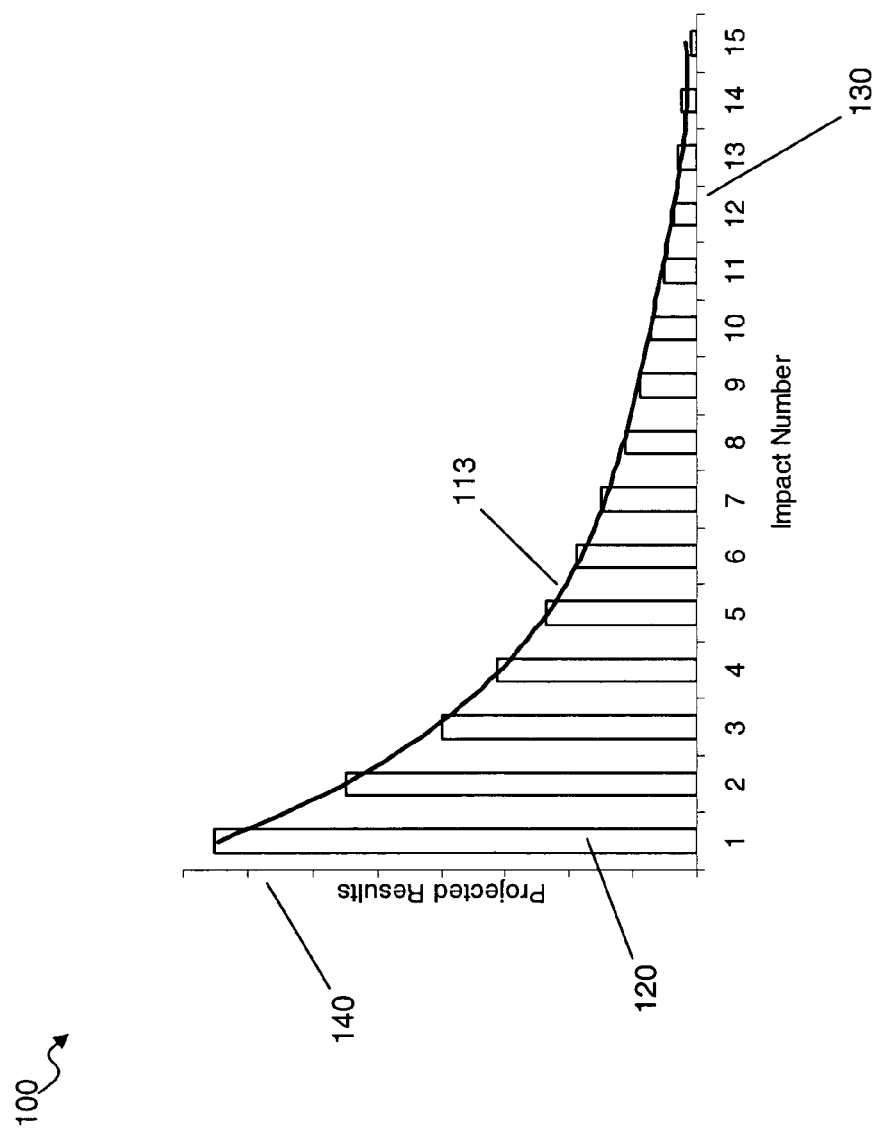
FIG. 13 is a projected result chart containing a predetermined curve shape according to the present invention.
Figure 14:
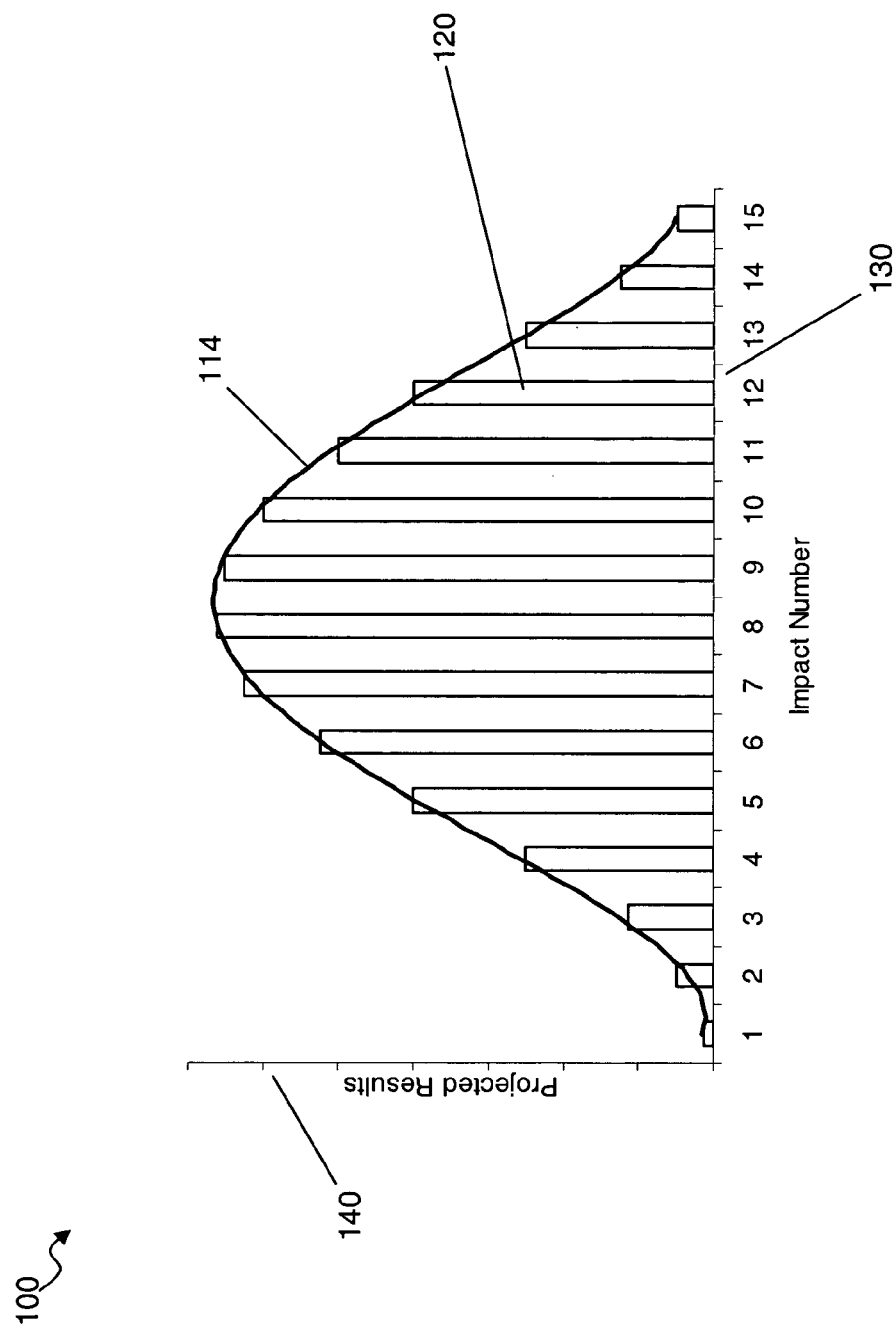
FIG. 14 is a projected result chart containing a predetermined curve shape according to the present invention.
Figure 15:
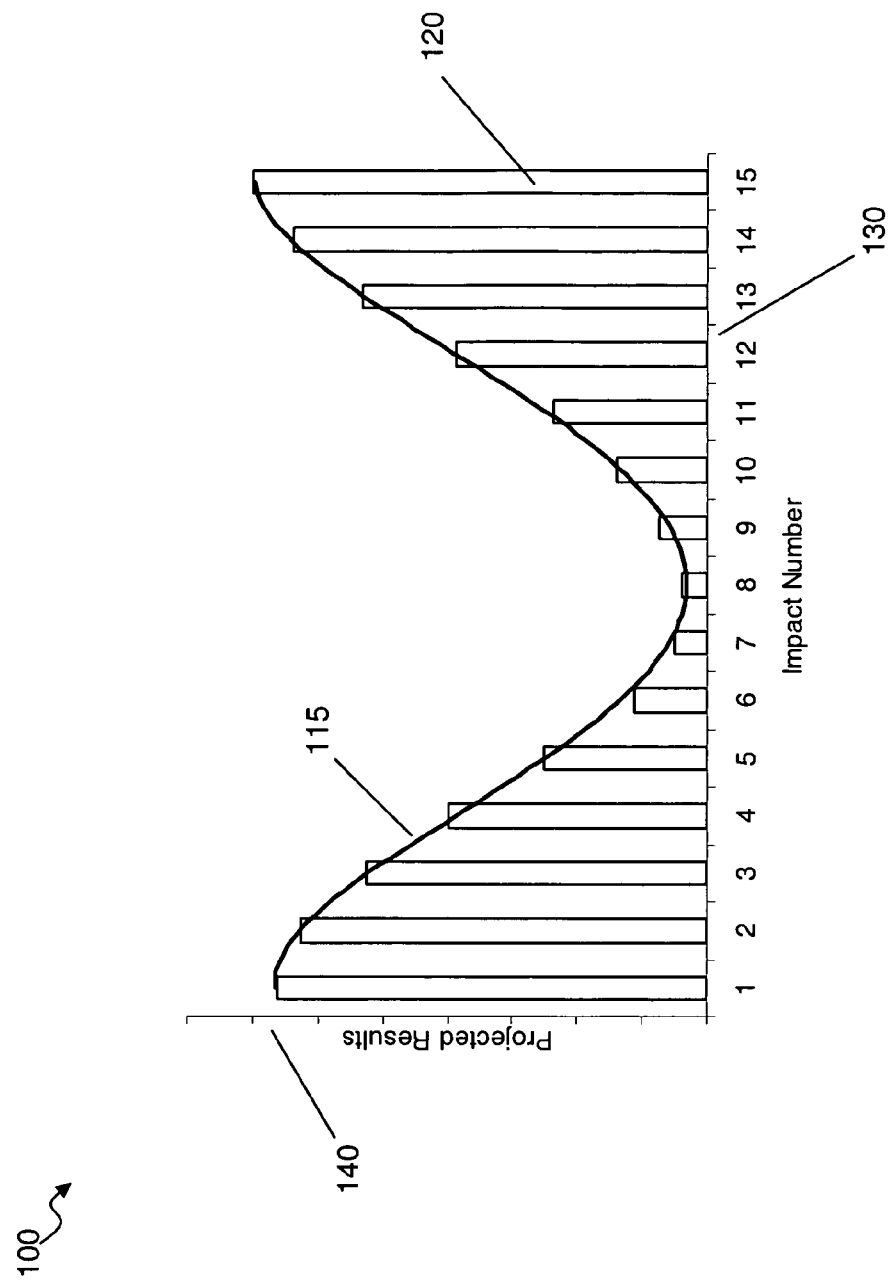
FIG. 15 is a projected result chart containing a predetermined curve shape according to the present invention.

The impact number is preferably an integer from 1-15, but can be any set of numbers. The curves were formulated by first determining the specific impact results at each impact number that gave a desired curve shape. For instance, in FIG. 1, a slow start was desired with a ramp up toward the end of the time period. And FIG. 13 shows the opposite. The remaining FIGS. 2-12, 14-15 show various curves shapes representing how an organization may expect to experience an opportunity's results. Preferably, the value of each specific impact result is arbitrary, what is important is the overall curve shape. These curves represent calendarization curves, which are graphical representations of the projected opportunity results over a time period.

After determining the specific impact results, a fourth-order polynomial or a logarithmic curve was fit to that data using a commercially available spreadsheet program. The formulas for each curve 101-115 in the respective figures are shown below, in Table 1:

TABLE 1

| Curve Number | Formula |
| --- | --- |
| 101 | $y = 0.0011x^4 - 0.0242x^3 + 0.2126x^2 - 0.5093x + 0.6525$ |
| 102 | $y = -0.0005x^4 - 0.003x^3 + 0.3043x^2 - 0.8319x + 0.7528$ |
| 103 | $y = 0.0027x^4 - 0.1038x^3 + 1.2389x^2 - 2.9899x + 2.2307$ |
| 104 | $y = 1.1324 \ln(x) + 0.125$ |
| 105 | $y = 0.7016 \ln(x) + 0.7633$ |
| 106 | $y = 0.3436 \ln(x) + 1.5043$ |
| 107 | $Y = 1.75$ |
| 108 | $y = -0.00006x^4 + 0.0016x^3 - 0.0158x^2 + 0.0376x + 2.4321$ |
| 109 | $y = -0.0001x^4 + 0.0028x^3 - 0.0317x^2 + 0.0992x + 2.5361$ |
| 110 | $y = -0.0002x^4 + 0.005x^3 - 0.0509x^2 + 0.1297x + 3.0565$ |
| 111 | $y = 0.0023x^4 - 0.0592x^3 + 0.3255x^2 - 0.7411x + 21.552$ |
| 112 | $y = -0.0005x^4 + 0.0349x^3 - 0.6053x^2 + 1.5609x + 20.421$ |
| 113 | $y = 0.0011x^4 - 0.0462x^3 + 0.7406x^2 - 5.7351x + 19.932$ |
| 114 | $y = 0.0048x^4 - 0.1614x^3 + 1.5528x^2 - 3.1375x + 2.0042$ |
| 115 | $y = -0.005x^4 + 0.1612x^3 - 1.445x^2 + 2.3442x + 12.348$ |

Table 1 illustrates the common calendarization curve shapes that are preferable. Alternatively, more complex curve shapes can be utilized. For instance, sales opportunities sometimes have brief jump in results for the first few impacts and then drop off before returning to the appropriate shape. Therefore, various curve shapes can be implemented to reflect these routine business occurrences, as needed.

Figure 16:
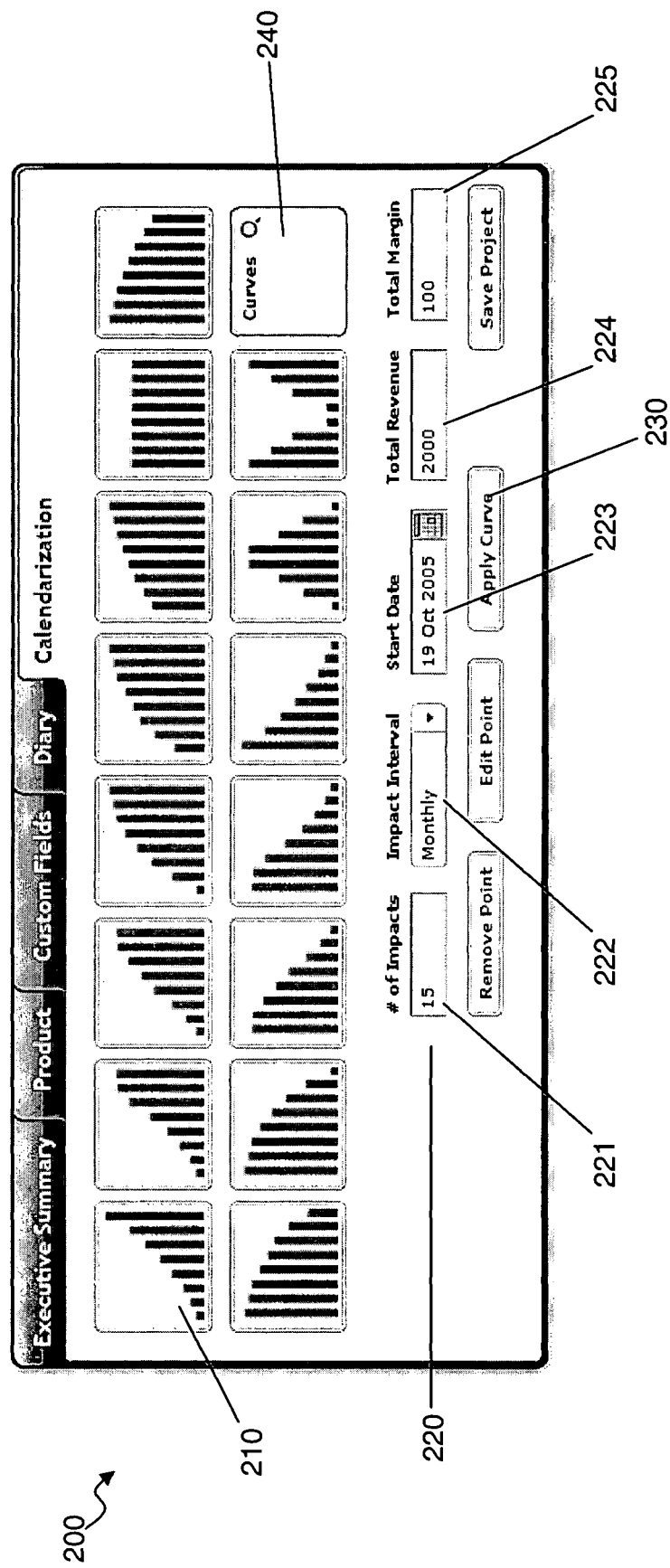
FIG. 16 is a screen view of a graphical user interface according to the present invention.

The present invention functions preferably via software that runs on a computer (with appropriate input devices attached, such as a keyboard and mouse). The software displays a graphical user interface on a display or monitor. Preferably, the present invention is a feature within an opportunity management software program, but it can alternatively operate independently. A screen view of a graphical user interface 200 according to the present invention is shown in FIG. 16. A user inputs values and indicates selections via a set of input boxes 220 that include the number of impacts 221, the impact interval 222, the start date 223, the total revenue 224, and the total margin 225. Additionally, an input box for total volume may be available to the user, but is not shown. Numbers for total revenue, total margin and/or total volume may be automatically brought over from the screen in which individual product revenues, margins and/or volumes are input.

Next, the user selects the appropriate curve for the opportunity's projected results via curve selection buttons 210. These buttons 210 include graphics depicting the general shape of the curve that the user wishes to use. These mimic some or all of the curves shown in FIGS. 1-15. Again, the user makes his or her selection based on how he or she believes the organization will experience the opportunity over a period of time. After selecting the appropriate curve, the variables are input in the input boxes 220.

After selecting an appropriate curve and inputting the variables, the user clicks on the apply curve button 230. Doing so causes the software to automatically generate a calendarization curve over the time period determined from the start date, number of impacts, and the impact interval. To generate the curve, the software first instructs the computer to calculate the time period by multiplying the number of impacts by the impact interval. Next, the software instructs the computer to generate and store a series of dates by evenly distributing the number of impacts over the time period starting with the start date. Then, the software generates the calendarization curve data by distributing the total result, whether revenue, margin, or volume, over the time period such that the resulting specific impact results 120 approximately follow the shape of the selected curve. If viewed graphically, the shape of the resulting calendarization, or forecast, data should have the same general shape as the selected curve.

The curve formulas shown in Table 1 are specific to a calendarization curve having 15 impacts. To calculate calendarization data for any number of impacts requires the following additional steps:
1. Create a new distribution of X-values for use in a Table 1 formula by equally distributing the new impacts over the original domain of 1-15;
2. Calculate the Y-values over the distribution of new X-values;
3. Calculate the total of the Y-values;
4. Calculate the percentage of the total for each point's Y-value;
5. Multiply each point's percentage by the desired total result (total revenue, margin, or volume) to get the final projected result for each new impact.

Figure 17:
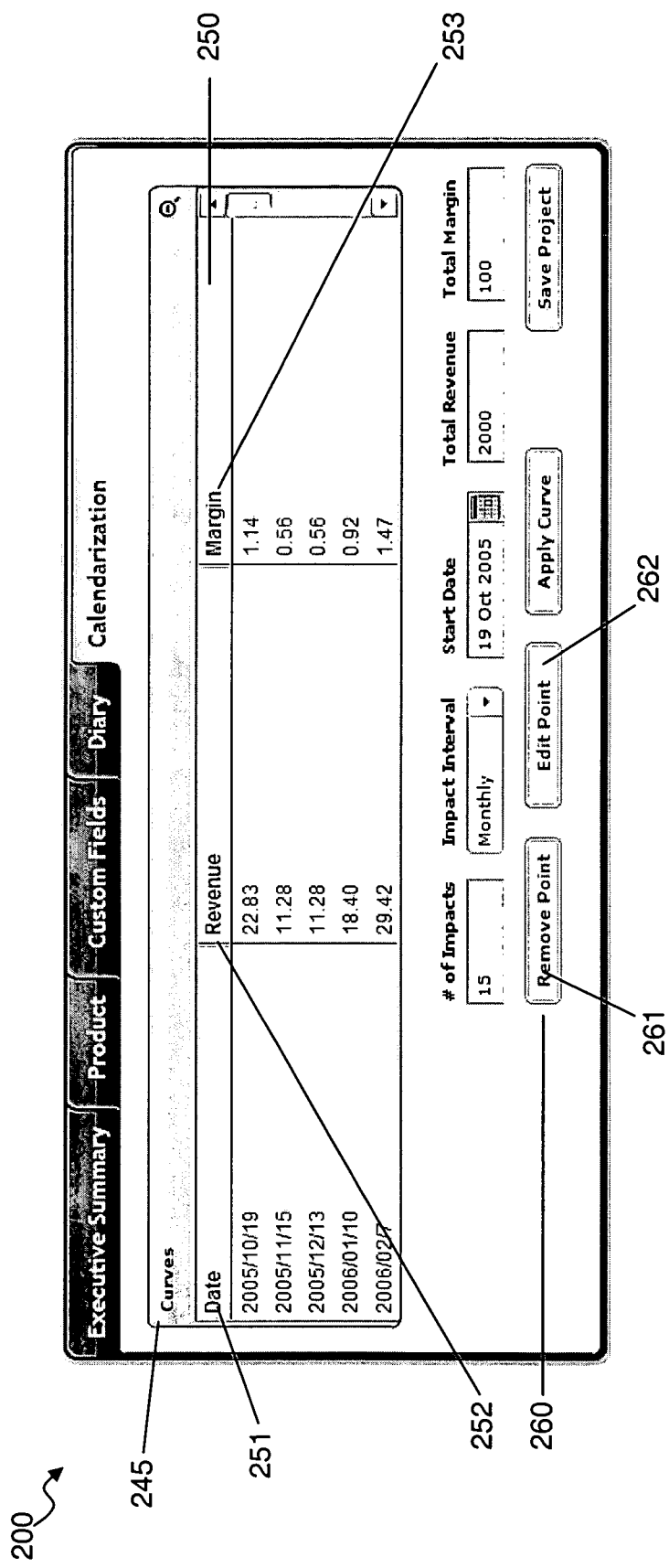
FIG. 17 is a screen view of a graphical user interface showing forecast data according to the present invention.

After calculating and storing the calendarization data, this can be viewed in several different ways. FIG. 17 shows the results being displayed textually in a data display window 245; preferably these results are displayed after the user clicks on the data display button 240 in FIG. 16. The data are displayed in columns with various headers 250. The date series 251 is displayed in the leftmost column; the impact results for revenue 252 and margin 253 are displayed in the next two columns to the right, respectively. Further, a column for volume may also be added to the displayed data. In addition to displaying the curve data textually, they may be displayed graphically (not shown). Such a graphical display would show curves having the general shape of the selected curve from FIGS. 1-15.

Sometimes, a sales representative, or other user, may have knowledge that a certain impact result will be different than provided by the predetermined curve shape. An individual data point therefore may be modified by first clicking on the appropriate row and then clicking on the edit point button 262. Alternatively, a data point may be entirely removed via the remove point button 261. However, after editing or removing a data point, the total result would be different; therefore, the software is programmed to require the user to manually reconcile the remaining results to cumulatively match the originally indicated total results. Preferably, this is done by reducing or increasing the impact results of the unedited points by an amount cumulatively equal to the result changed by editing the data point.

Preferably, the generated calendarization data can be used for the purpose of forecasting. The generated curve can be used with other curves from other opportunities to make better decisions for the organization at certain points in time.

Certain modifications and improvements will occur to those skilled in the art upon a reading of the foregoing description. By way of example, additional curve shapes may be established added to the set of predetermined curve shapes. All modifications and improvements have been deleted herein for the sake of conciseness and readability but are properly within the scope of the following claims.

the invention claimed is:

1. A method of providing an interactive user interface for facilitating sales forecasting, comprising the following steps:
receiving and displaying, by a computer running software and a display, including a graphic user interface (GUI) including a curve selection button, an apply curve button, a sales event interval indication box, and a start date indication box, input from a sales representative for indicating a number of sales events for the period of time;
receiving via the GUI via the sales event interval indication box an indication of a sales event interval;
receiving via the GUI via the start date indication box an indication of a start date for the period of time;
calculating by the computer the period of time by multiplying the sales event interval by the number of sales events;
generating by the computer a series of dates by evenly distributing the number of events over the period of time starting with the start date;
receiving by the computer via the GUI an indication of at least one cumulative sales result for the period of time;
offering by the GUI predetermined general forecast curve shapes to the sales representative;
receiving by the computer via the curve selection button of the GUI the selection of the predetermined general forecast curve shape from the sales representative;
upon activation of the apply curve button of the GUI, automatically and discretely distributing by the computer the at least one cumulative sales result over the period of time at each date in the series of dates to approximate the shape of the predetermined general forecast curve shape when viewed graphically on the GUI;

wherein the curve selection button includes the predetermined general forecast curve shape;
wherein the predetermined general forecast curve shape is selected from the group consisting of:
$y=0.0011x^4 -0.0242x^3 +0.2126x^2 -0.5093x +0.6525$; $y=-0.0005x^4 -0.003x^3 +0.3043x^2 -0.8319x +0.7528$; $y=0.0027x^4 -0.1038x^3 +1.2389x^2 -2.9899x +2.2307$; $y=1.1324Ln(x) +0.125$; $y=0.7016Ln(x) +0.7633$; $y=0.3436Ln(x) +1.5043$; $y=1.75$; $y=-0.00006x^4 +0.0016x^3 -0.0158x^2 +0.0376x +2.4321$; $y=-0.0001x^4 +0.0028x^3 -0.0317x^2 +0.0992x +2.5361$; $y=-0.0002x^4 +0.005x^3 -0.0509x^2 +0.1297x +3.0565$; $y=0.0023x^4 -0.0592x^3 +0.3255x^2 -0.7411x +21.552$; $y=-0.0005x^4 +0.0349x^3 -0.6053x^2 +1.5609x +20.421$; $y=0.0011x^4 -0.0462x^3 +0.7406x^2 -5.7351x +19.932$; $y=0.0048x^4 -0.1614x^3 +1.5528x^2 -3.1375x +2.0042$; and $y=-0.005x^4 +0.1612x^3 -1.445x +2.3442x +12.348$.

2. The method of claim 1, wherein the cumulative sales result is a revenue, volume, savings, profit, windfall, or improved negotiated position.

3. The method of claim 1, wherein the number of events is the number of times an organization has the right to experience an opportunity's results over the period of time.

4. The method of claim 1, wherein the event interval is how often an organization expects to experience an opportunity's results over a period of time.

5. The method of claim 1, wherein the start date is when an organization expects to begin executing an opportunity.

6. The method of claim 1, wherein the predetermined general forecast curve shape is a graphical representation of an opportunity's results over time.

7. The method of claim 1, wherein the predetermined general forecast curve shape is selected from the group consisting of:
$y=0.0011x^4 -0.0242x^3 +0.2126x^2 -0.5093x +0.6525$; $y=-0.0005x^4 -0.003x^3 +0.3043x^2 -0.8319x +0.7528$; $y=0.0027x^4 -0.1038x^3 +1.2389x^2 -2.9899x +2.2307$; $y=1.1324Ln(x) +0.125$; $y=0.7016Ln(x) +0.7633$; $y=0.3436Ln(x) +1.5043$; $y=1.75$; $y=-0.00006x^4 +0.0016x^3 -0.0158x^2 +0.0376x +2.4321$; $y=-0.0001x^4 +0.0028x^3 -0.0317x^2 +0.0992x +2.5361$; $y=-0.0002x^4 +0.005x^3 -0.0509x^2 +0.1297x +3.0565$; $y=0.0023x^4 -0.0592x^3 +0.3255x^2 -0.7411x +21.552$; $y=-0.0005x^4 +0.0349x^3 -0.6053x^2 +1.5609x +20.421$; $y=0.0011x^4 -0.0462x^3 +7406x^2 -5.735x +19.932$; $y=0.0048x^4 -0.1614x^3 +1.5528x^2 -3.1375x +2.0042$; and $y=-0.005x^4 +0.1612x^3 -1.445x +2.3442x +12.348$.

8. The method of claim 1, wherein the predetermined general forecast curve shape is represented by a polynomial, logarithmic, exponential, or linear equation.

9. The method of claim 1, wherein the forecast data is edited at least one date within the series of dates, creating edited and unedited forecast data.

10. The method of claim 9, further comprising the step of the software requiring a user to modify the unedited forecast data such that the at least one cumulative result remains the same as originally indicated.

11. The method of claim 1, further including the steps of:
the computer presenting the curve with data to the sales representative for modifications;
the computer receiving the modifications to the curve shape and displaying the modified curve shape.

12. A method of providing an interactive user interface for generating and displaying forecast data over a period of time, comprising the following steps:
receiving and displaying, by a computer running software and a display, including a graphic user interface (GUI) including a curve selection button, an apply curve button, an event interval indication box, and a start date indication box, input from a sales representative for indicating a number of events for the period of time;
receiving via the GUI via the event interval indication box an input of an event interval;
receiving via the GUI via the start date indication box an input of a start date for the period of time;
receiving via the GUI an indication of at least one cumulative result for the period of time;
offering by the GUI predetermined general forecast curve shapes to the sales representative;
indicating via the curve selection button of the GUI by the sales representative one of the predetermined general forecast curve shape;
upon activation of the apply curve button of the GUI, creating by the computer forecast data with the software, comprising the following steps:
calculating by the computer the period of time by multiplying the event interval by the number of events;
generating by the computer a series of dates by evenly distributing the number of events over the period of time starting with the start date; the computer calculating the cumulative result for the period of time and discretely distributing the at least one cumulative result over the period of time at each date in the series of dates to approximate the shape of the predetermined general forecast curve shape when viewed graphically; and
displaying the data on the GUI;
wherein the curve selection button includes predetermined general forecast curve shape;
wherein the predetermined general forecast curve shape is selected from the group consisting of:
$y=0.0011x^4 -0.0242x^3 +0.2126x^2 -0.5093x +0.6525$; $y=-0.0005x^4 -0.003x^3 +0.3043x^2 -0.8319x +0.7528$; $y=0.0027x^4 -0.1038x^3 +1.2389x^2 -2.9899x +2.2307$; $y=1.1324Ln(x) +0.125$; $y=0.7016Ln(x) +0.7633$; $y=0.3436Ln(x) +1.5043$; $y=1.75$; $y=-0.00006x^4 +0.0016x^3 -0.0158x^2 \, 0.0376x +2.4321$; $y=-0.0001x^4 +0.0028x^3 -0.0317x^2 +0.0992x +2.5361$; $y=-0.0002x^4 +0.005x^3 -0.0509x^2 +0.1297x +3.0565$; $y=0.0023x^4 -0.0592x^3 +0.3255x^2 -0.7411x +21.552$; $y=-0.0005x^4 +0.0349x^3 -0.6053x^2 +1.5609x +20.421$; $y=0.0011x^4 -0.0462x^3 +0.7406x^2 -5.7351x +19.932$; $y=0.0048x^4 -0.1614x^3 +1.5528x^2 -3.1375x +2.0042$; and $y=-0.005x^4 +0.1612x^3 -1.445x +2.3442x +12.348$.

13. The method of claim 12, wherein the data is displayed graphically on the display.

14. The method of claim 12, wherein the forecast data is edited by the user at least one date within the series of dates, creating edited and unedited forecast data.

15. The method of claim 14, further comprising the step of the software requiring a user to modify the unedited forecast data such that the at least one cumulative result remains the same as originally indicated.

16. The method of claim 14, wherein the predetermined general forecast curve shape is represented by a polynomial, logarithmic, exponential or linear equation.

17. The method of claim 1, wherein the computer automatically redistributing the cumulative result over the modified curve shape to maintain the cumulative results.

18. A method of providing an interactive user interface for facilitating sales forecasting, comprising the following steps:
receiving and displaying, by a computer running software and a display, including a graphic user interface (GUI)

including a curve selection button, an apply curve button, a sales event interval indication box, and a start date indication box, input from a sales representative for indicating a number of sales events for the period of time;

receiving via the GUI via the sales event interval indication box an input of a sales event interval;

receiving via the GUI via the start date selection box an input of a start date for the period of time;

calculating by the computer the period of time by multiplying the sales event interval by the number of sales events;

generating by the computer a series of dates by evenly distributing the number of events over the period of time starting with the start date;

receiving by the computer an indication at least one cumulative sales result for the period of time from the sales representative;

offering by the GUI predetermined general forecast curve shapes to the sales representative;

receiving by the computer the selection of the predetermined general forecast curve shape from the sales representative via the curve selection button of the GUI;

wherein the predetermined general forecast curve shape is selected from the group consisting of: $y=0.0011x4-0.0242x3+0.2126x2-0.5093x +0.6525$; $y=-0.0005x4-0.003x3+0.3043x2-0.8319x +0.7528$; $y=0.0027x4-0.1038x3+1.2389x2-2.9899x +2.2307$; $y=1.1324Ln(x) +0.125$; $y=0.7016Ln(x) +0.7633$; $y=0.3436Ln(x) +1.5043$; $y=1.75$; $y=-0.00006x4+0.0016x3-0.0158x2+ 0.0376x +2.4321$; $y=-0.0001x4+0.0028x3-0.0317x2+ 0.0992x +2.5361$; $y=-0.0002x4+0.005x3-0.0509x2+ 0.1297x +3.0565$; $y=0.0023x4-0.0592x3+0.3255x2- 0.7411x +21.552$; $y=-0.0005x4+0.0349x3-0.6053x2+ 1.5609x +20.421$; $y=0.0011x4-0.0462x3+0.7406x2- 5.7351x +19.932$; $y=0.0048x4-0.1614x3+1.5528x2- 3.1375x +2.0042$; and $y=-0.005x4+0.1612x3-1.445x +2.3442x +12.348$; and upon activation of the apply curve button of the GUI, automatically and discretely distributing by the computer the at least one cumulative sales result over the period of time at each date in the series of dates to approximate the shape of the predetermined general forecast curve shape when viewed graphically on the GUI;

wherein the curve selection button includes the predetermined general forecast curve shape.

* * * * *